United States Patent [19]
Steele et al.

[11] Patent Number: 5,794,462
[45] Date of Patent: Aug. 18, 1998

[54] DISABLING DEVICE

[75] Inventors: Duncan Andrew Steele; David Graham Silvester, both of Billingshurst, England

[73] Assignee: Trailer Lock Development Limited, Billingshurst, United Kingdom

[21] Appl. No.: 454,300

[22] PCT Filed: Dec. 14, 1993

[86] PCT No.: PCT/GB93/02545

§ 371 Date: Aug. 11, 1995

§ 102(e) Date: Aug. 11, 1995

[87] PCT Pub. No.: WO94/13500

PCT Pub. Date: Jun. 23, 1994

[30] Foreign Application Priority Data

| Dec. 16, 1992 | [GB] | United Kingdom | 9226245 |
| Jun. 17, 1993 | [GB] | United Kingdom | 9312496 |
| Sep. 9, 1993 | [GB] | United Kingdom | 9318683 |
| Nov. 20, 1993 | [GB] | United Kingdom | 9323910 |

[51] Int. Cl.$^6$ ........................... G05G 5/00
[52] U.S. Cl. .................. 70/18; 70/56; 70/164; 70/181
[58] Field of Search ............ 70/209, 212, 164, 70/175, 14, 58, 232, 258, 54–56, 18, 158, 174, 181, 253, 203; 280/507

[56] References Cited

U.S. PATENT DOCUMENTS

| 1,364,068 | 1/1921 | Brader | 70/212 |
| 1,488,893 | 4/1924 | Plouffe | 70/226 |
| 3,889,500 | 6/1975 | Hix et al. | 70/212 X |
| 4,417,644 | 11/1983 | Brogard | 70/423 X |
| 4,475,366 | 10/1984 | Marneris | 70/212 X |
| 4,506,528 | 3/1985 | Eberly | 70/18 |
| 4,730,468 | 3/1988 | Becker | 70/235 X |
| 4,765,164 | 8/1988 | Prince, Jr. | 70/232 X |
| 4,836,570 | 6/1989 | Lopez et al. | 70/237 X |
| 5,372,018 | 12/1994 | Smith | 70/56 X |

FOREIGN PATENT DOCUMENTS

| 2458410 | 2/1981 | France | 280/507 |
| 389215 | 1/1924 | Germany | 70/164 |
| 3502701 | 7/1986 | Germany | 280/507 |
| 278586 | 10/1927 | United Kingdom | 70/164 |

*Primary Examiner*—Lloyd A. Gall
*Attorney, Agent, or Firm*—Ware, Fressola, Van Der Sluys & Adolphson, LLP

[57] ABSTRACT

A disabling device comprises a U member (12) having a U-shaped cross section defining a base of the U and two limbs (21, 22). Each limb has an aperture (23, 24), the two apertures being opposite each other. A pin (11) has a stem (32) and a head (31), the stem being sized to engage in the apertures (23, 24) and to extend between the limbs while engaged in the apertures. A lock (14) locks the pin to the U member, whereby the device cannot be removed from the apparatus being disabled.

4 Claims, 7 Drawing Sheets

5,794,462

DISABLING DEVICE

FIELD OF THE INVENTION

The present invention relates to a device for disabling apparatus, particularly though not exclusively for disabling a vehicle or its trailer.

BACKGROUND OF THE INVENTION

Theft of contractors plant is a severe problem.

The object of the invention is to provide a means of disabling a vehicle, trailer or the like to render its movement difficult and hence deter its theft.

THE INVENTION

According to the invention there is provided a disabling device for disabling apparatus to which the device is locked, the device comprising:

- a U member having a U-shaped cross-section defining a base of the U and two limbs;
- each limb having an aperture, the two apertures being opposite each other;
- a removable pin having a stem and a head, the stem being sized to engage in the apertures and to extend through the limbs whilst engaged in the apertures; and
- a lock for locking the pin to the U member, whereby the device cannot be removed from the apparatus, which is thereby disabled.

Normally the lock is a padlock and the pin is adapted for locking to the U member with the padlock positioned between the limbs of the U member.

Preferably, a portion of the pin passes through an aperture in one of the limbs and has a transverse bore for receiving the link or pin of the padlock, the transverse bore being between the limbs of the U member when the pin is engaged.

Conveniently, the stem of the pin has the transverse bore for receiving the link or pin of the padlock.

Preferably, the head of the pin and the limb, against which it lies when the stem is engaged in the apertures, are adapted to prevent rotation of the engaged pin.

In simple embodiments of the disabling device, the anti-rotation adaption is in the form of a flat on the head and a bar or flange fixed on the limb, the flat being spaced from the centre of the stem of the pin such that it fits closely to the bar or flange when the pin is inserted in the apertures.

As described in our International Patent Application No. PCT/GB93/00416 we have described disabling of a tracked vehicle by passing a pin through an aperture in a track of the vehicle and locking the pin to the chassis of the vehicle. For an elastomeric material track we proposed to cut or pre-fabricate the aperture in the track.

We now propose to utilise one of the drive sprocket apertures already provided in the track in combination with one embodiment of the disabling device for disabling the vehicle equipped with the track.

In this embodiment of the disabling device:

- the stem of the pin is sized to pass through a drive sprocket aperture;
- the device includes a bracket defining an aperture and welded in use to a chassis part of the vehicle and adapted both to receive one limb of the U member in its aperture with the apertures in the limbs aligned with one of the drive sprocket apertures and the bracket between the aperture in the received limb and the base of the U member securing the U member to the chassis part; and
- the arrangement is such that in use the lock locks the pin across the limbs of the U member with its stem passing through the track aperture, whereby the vehicle is disabled from movement of its track.

In this embodiment, the anti-rotation adaption can be in the form of a spigot fixed to the head, extending in the same direction as the stem and spaced from it, and a second aperture in the limb against which the head lies when the stem is engaged in the apertures, the spigot engaging in the second aperture to prevent rotation of the engaged pin.

Preferably, the spigot has the transverse bore for receiving the link or pin of the padlock.

In another embodiment of the disabling device, it is adapted to disable a telescopic actuator;

- the U member is a channel member sized to fit a rod of the actuator between its cylinder and an end fitting of the rod; and
- the arrangement is such that in use the lock locks the channel member to the rod, whereby the actuator cannot be stroked with the channel member fitted due to interposition of the channel member between the cylinder and the end fitting.

Where the telescopic actuator is for instance a steering ram of a vehicle, the vehicle is disabled by disablement of the steering ram.

Preferably, the channel member has end flanges for abutting the cylinder and the end fitting of the actuator without damaging them, should attempt be made to stroke the actuator without removal of the channel member.

The channel member may be a double overlapping channel, comprised of two channel elements, each having a plurality of apertures in each limb, the plurality of apertures being arrayed along the length of the channel elements, whereby the separation of the ends of the channel member can be adjusted to suit different lengths of actuator.

In a third embodiment of the disabling device, the U member has the length and width of its base and the height of its limbs all of the same order of magnitude and the separation of its limbs suitable to accommodate a towing eye, whereby the device is adapted to disable the towing eye of a trailer.

THE DRAWINGS

To help understanding of the invention, three specific embodiments and variants thereof will now be described with reference to the accompanying drawings, in which.

3

Figure 11:
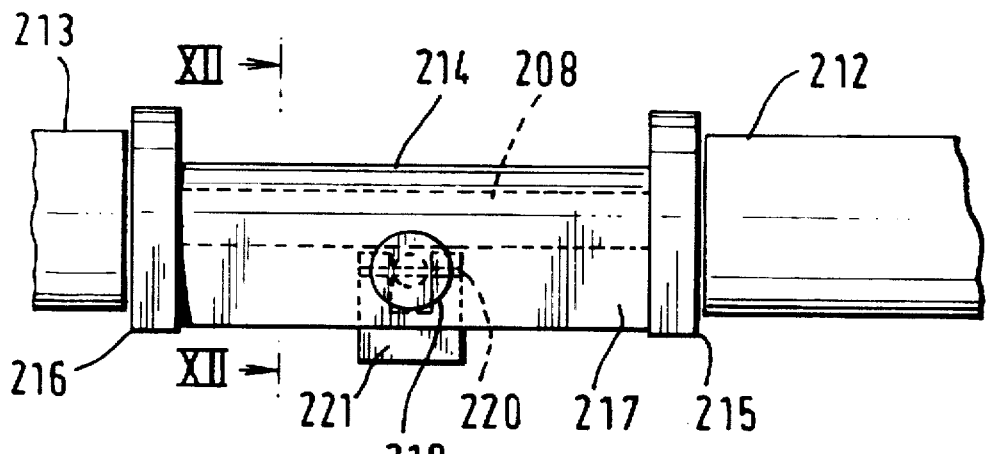
Figure 12:
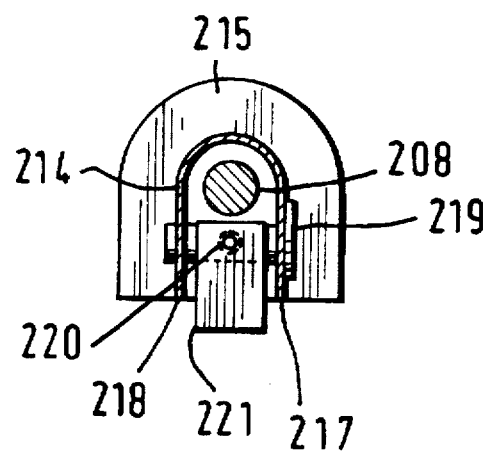
Figure 13:
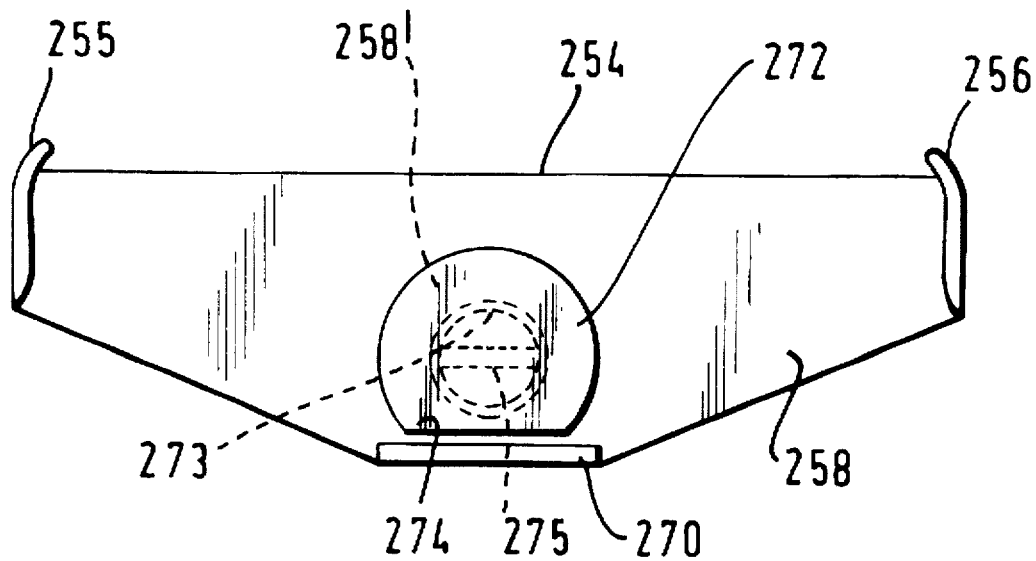
Figure 14:
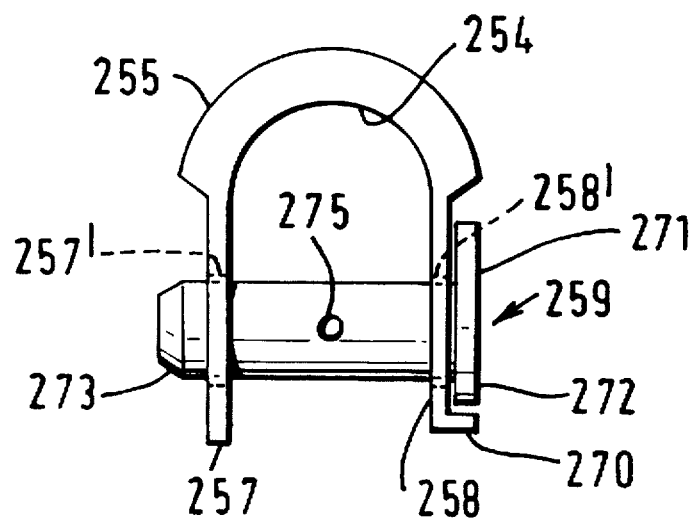
Figure 15:
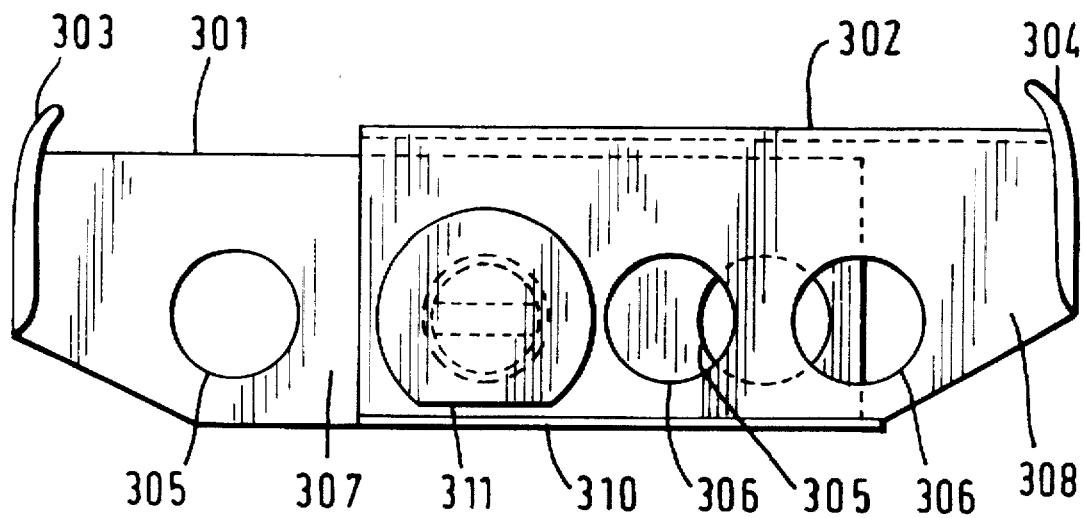
Figure 16:
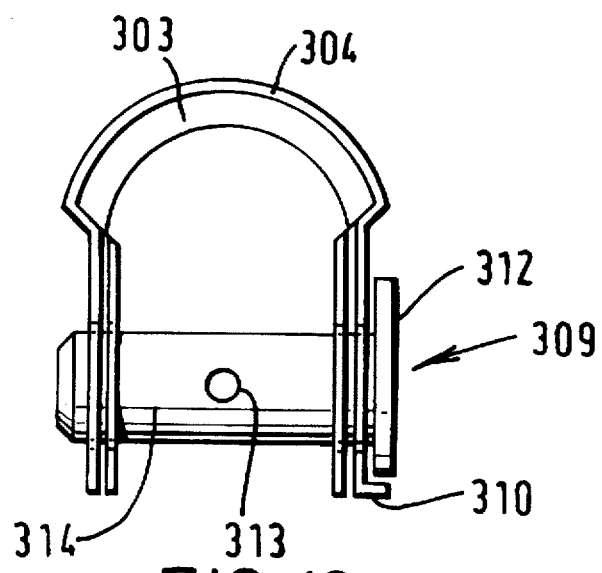
Figure 17:
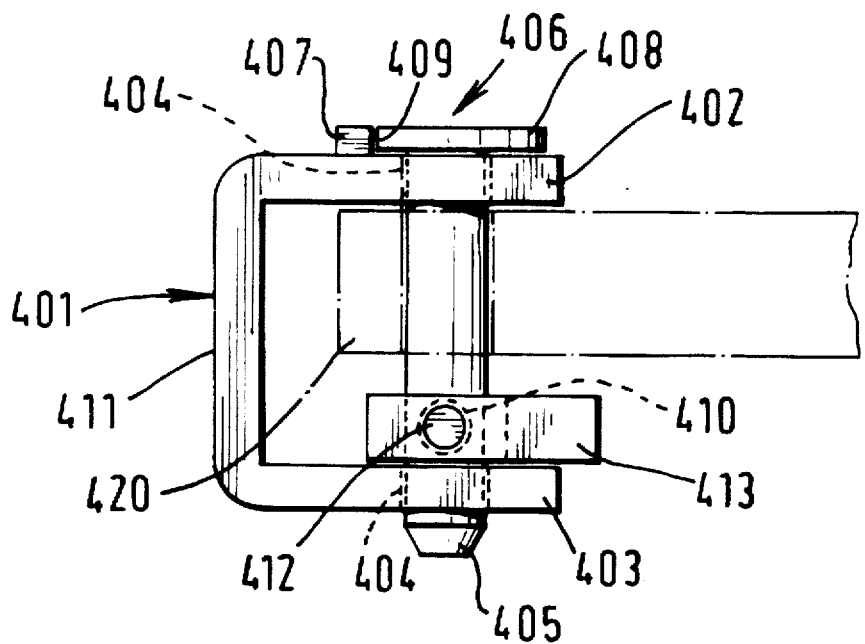
Figure 18:
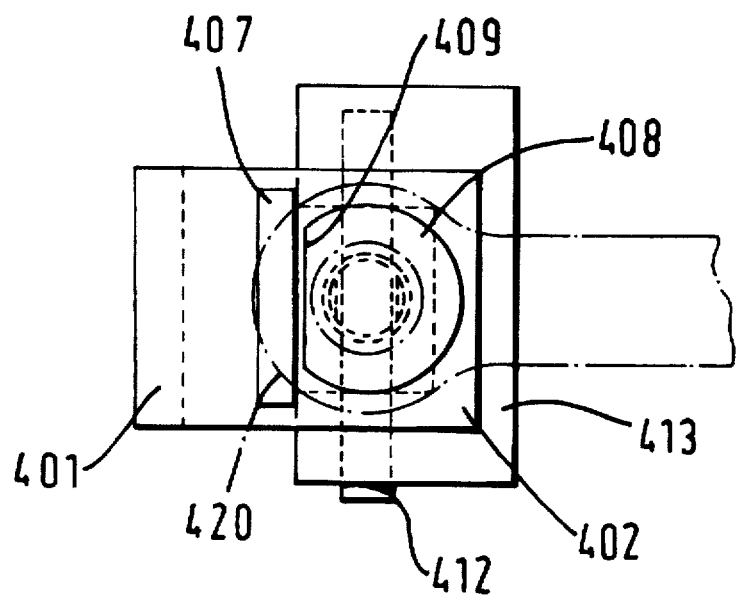

FIG. 11 is a side view of the ram lock fitted to the steering ram;

FIG. 12 is a cross-sectional end view on the line XII—XII in FIG. 11;

FIG. 13 is a side view similar to FIG. 11 of a first variant ram lock;

FIG. 14 is an end view of the variant of FIG. 13;

FIG. 15 is another side view similar to FIG. 11 of a second variant ram lock;

FIG. 16 is an end view of the second variant ram lock;

FIG. 17 is a side view of a disabling device of the third embodiment of the invention in use as an eye lock; and FIG. 18 is a plan view of the disabling device of FIG. 17.

FIRST EMBODIMENT OF THE INVENTION

Figure 1:
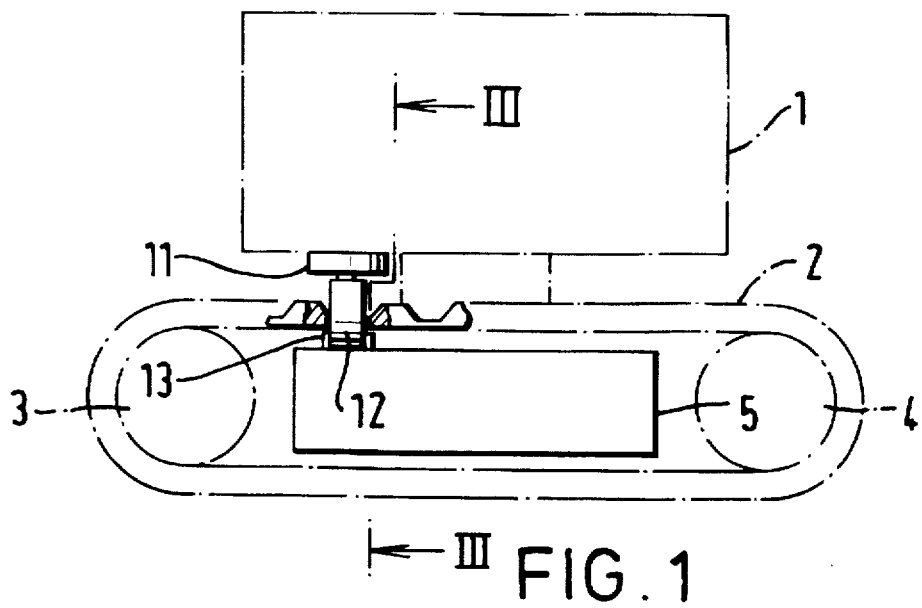
FIG. 1 is a diagrammatic side view of a tracked vehicle having a disabling device of the first embodiment of the invention fitted as a track lock.
Figure 2:
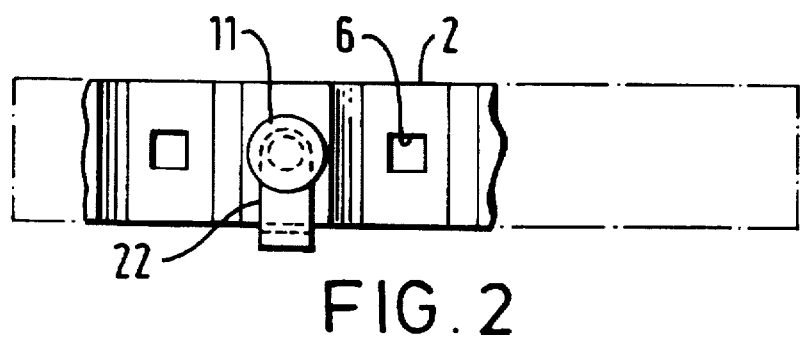
FIG. 2 is a diagrammatic plan view of the track of the vehicle of FIG. 1.

Referring first to FIGS. 1 and 2, a tracked vehicle 1 has at one side an elastomeric material track 2 mounted to run on sprocket drive wheels 3,4 around a carriage 5. Drive from the sprocket wheels 3,4 to the track is via apertures 6 in the track, along its centre line, as is conventional.

In accordance with the invention, a lock pin 11 having a head 31 and a stem 32, a U member 12, a bracket 13 and a padlock 14 lock the track to the chassis. The padlock is of the box type as sold under the Viro trade mark. The bracket 13 is of invert U shape and is welded to the carriage 5 to define with it an aperture 13'. The U member 12 is of aluminium to resist flame cutting. When fitted its limbs 21,22 lie horizontally, with the lower limb 21 received through the bracket, that is in the aperture it defines with the carriage, so that the limbs extend in beyond the centre of the track. The upper limb 22 extends above the track. Both limbs have a respective aperture or through bore 23,24, which bores are mutually aligned and are in alignment with one of the track apertures 6, when the U member is pushed fully home against the bracket 13 and the track 2 is in a suitable position with respect to the carriage.

Figure 3:
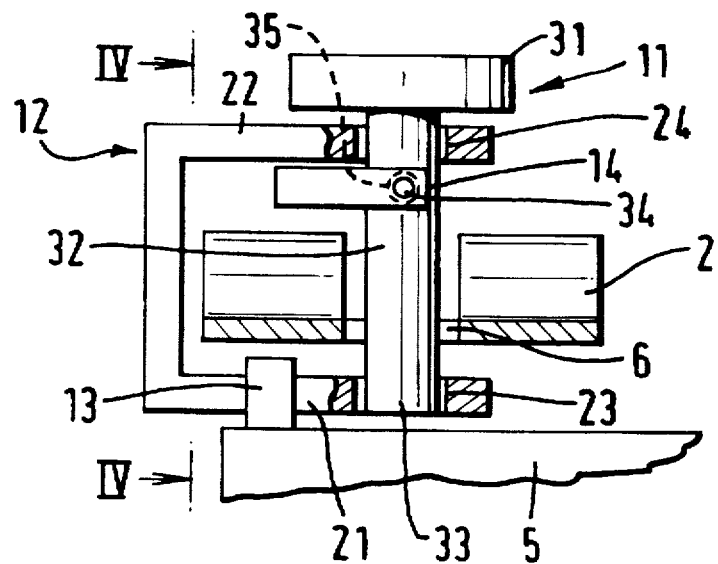
FIG. 3 is a cross-sectional view on the line III—III in FIG. 1 of the disabling device.
Figure 4:
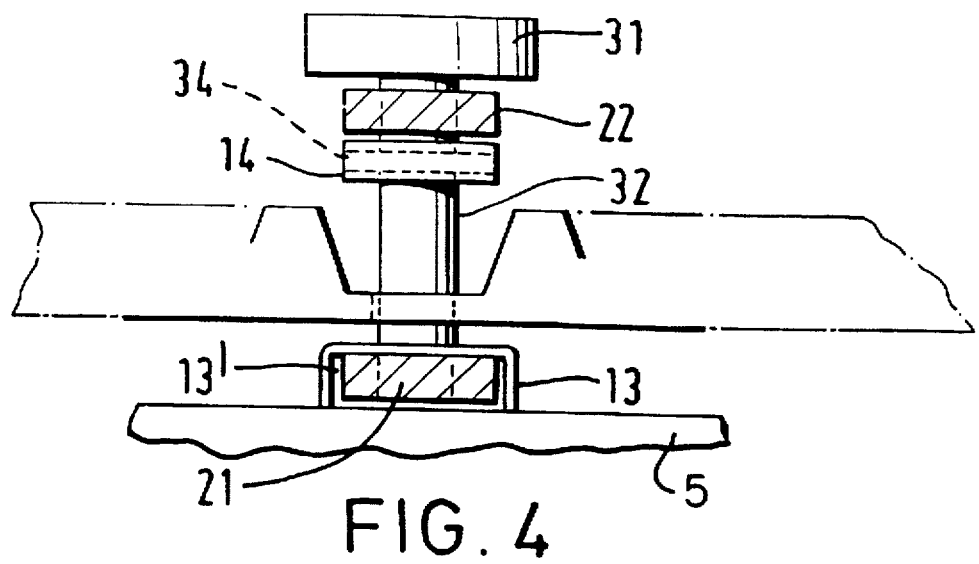
FIG. 4 is a cross-sectional side view on the line IV—IV of the disabling device of FIG. 3.

With the U member thus engaged, the stem of the pin— also of aluminium—can be dropped into the bores 23,24. The pin's head 31 then rests on the upper limb 22, with its stem 32 passing through the bores 23,24 and the track aperture 6. The end 33 of the pin remote from the head is firmly engaged in the lower limb 21. As shown in FIG. 3, the end 33 may be flush with the outside of the lower limb 21. Alternatively, the end 33 may extend beyond the limb 21.

The pin and U member are secured in this position by the padlock whose own pin 34 passes through a cross-bore 35 in the stem 31 immediately below the inside of the upper limb 22 of the U member. Thus, without authorised removal of the padlock, the pin cannot be disengaged from the U member; the track 2 cannot be moved and the vehicle is disabled. Positioning of the padlock between the limbs inhibits interference with it.

First Variant of the First Embodiment

Figure 5:
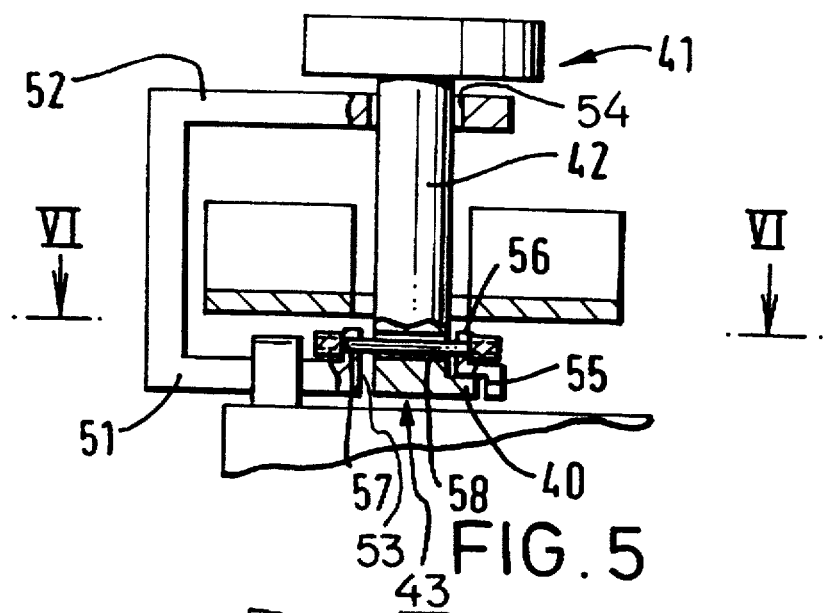
FIG. 5 is a view similar to FIG. 3 of a first variant of the disabling device as a track lock.
Figure 6:
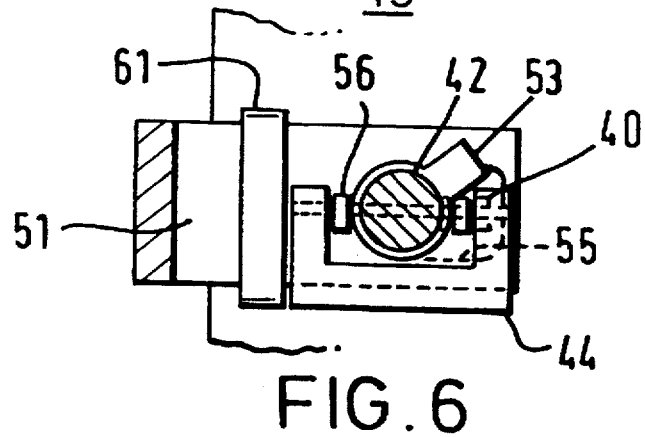
FIG. 6 is a cross-sectional plan view on the line VI—VI in FIG. 5 of the varied disabling device.

Referring now to FIGS. 5 and 6, this first variant of the first embodiment has a modified pin 41 having a lug 40 at its end 43 and the modified bores 53,54 in the U member, which are key-hole slot shaped to allow the stem 42 of the pin to pass into them. The lower limb 51 has an undercut 55 into which the pin's lug 40 can be turned when engaged in the lower limb's bore 53. A pair of lugs 56 are provided on the upper surface of the lower limb and have respective bores 57 which are in alignment with a bore 58 in the stem when the lug 40 is in the undercut 55. In this position, the padlock 44 can be fitted to the bores 57,58, thus securing the pin 41 to the lower limb 51. The latter is itself held to the carriage by a bracket 61. Thus the vehicle is disabled.

Second Variant of the First Embodiment

Figure 7:
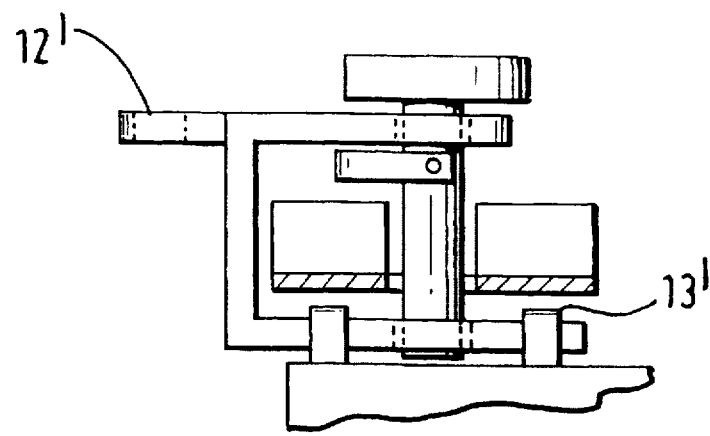
FIG. 7 is a view similar to FIG. 3 of a second variant of the disabling device as a track lock.

The disabling device shown in FIG. 7 is varied from the first embodiment in that a second bracket 13' is welded to the carriage of the disabled vehicle for receiving the lower limb of the U member of the disabling device.

Also shown in FIG. 7 is a side bracket 12' welded to the U member for locking on of a trailer by means of a lock of our International Application No.PCT/GB93/00426.

Third Variant of the First Embodiment

Figure 8:
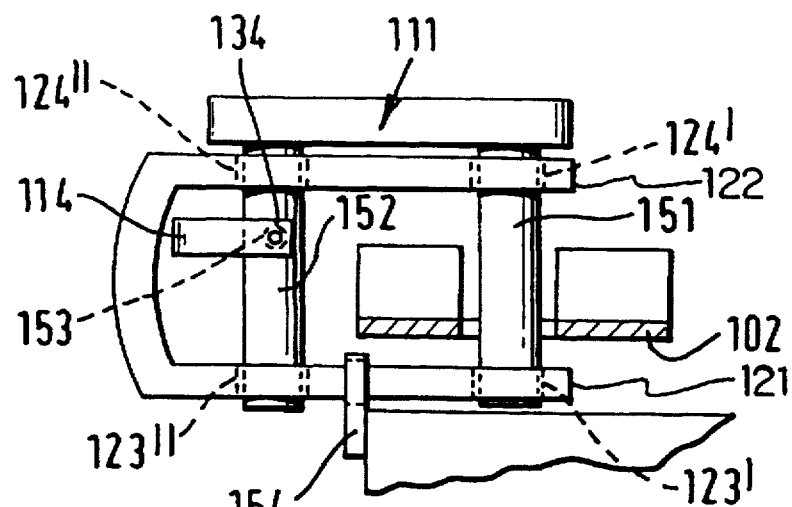
FIG. 8 is a similar view of a third variant track lock.

The disabling device shown in FIG. 8 has a lock pin 111 which has a stem 151 and a spigot 152, each extending through respective bores 124', 124" in the top limb 122 of the U member and bores 123',123" in the bottom limb 121. The stem 151 engages in the track 102. The spigot 152 has an opening 153 for receiving the pin 134 of a padlock 114. The device is held in position by means of a slotted plate 154 welded to the side of the vehicle's carriage and through which the lower limb extends.

Fourth Variant of the First Embodiment

Figure 9:
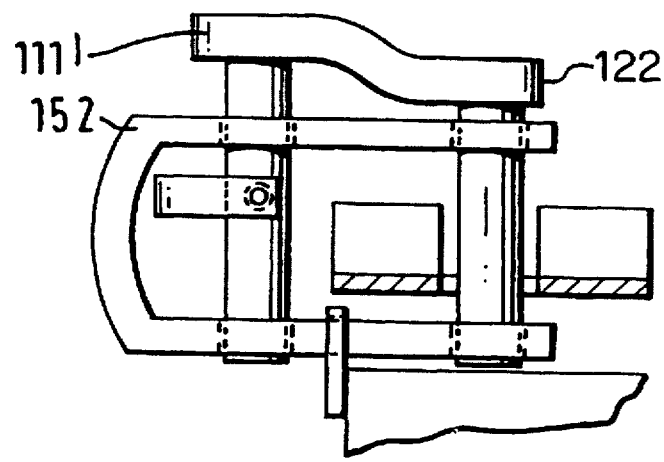
FIG. 9 is a similar view of a fourth variant track lock.

In the variant of FIG. 9, lock pin 111' is cranked upwardly, to allow a space between itself and the top limb 122 at the outer finger 152, such that the eye of a trailer can be locked to the disabling device.

This first embodiment and its variants are not intended to be restricted to the details of them as described above. For instance, the pin and U member may be of steel; the stem 32 of the pin may be of sufficient length for a trailer's eye to be locked to the vehicle with the stem passing through the eye and the latter resting on the track beneath the pin's head; and the stem may be apertured for fitting of the padlock immediately below the track—but still between the limbs of the U member.

The spigot 152 of the third variant may not extend as far as the lower limb 121, which then need not be provided with the bore 123".

SECOND EMBODIMENT OF THE INVENTION

Figure 10:
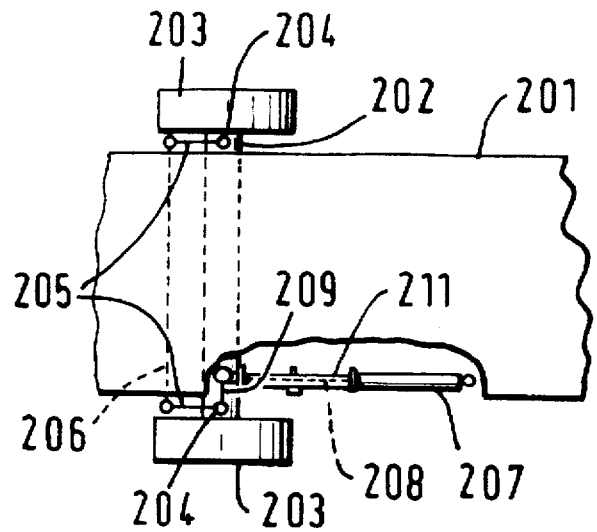
FIG. 10 is a diagrammatic plan view of a vehicle's steering linkage, with a disabling device of the second embodiment of the invention fitted on a steering ram as a ram lock.

Referring now to FIG. 10, a vehicle with a body 201 (shown partially) has a front axle 202 and front wheels 203. The wheels are connected to the axle about king pins 204. Forwards-directed radius arms 205 are fixed to hubs of the wheels 203 and interconnected by a steering link 206, whereby the wheels are steered together. A steering ram 207 has a forwards extending rod 208, connected at its remote end to steering arm 209 fast with the nearside wheel's hub. Stroking of the ram causes the wheels to be steered together.

Fitted on the rod 208 is disabling device of the invention in the form of a ram lock 211. It extends between a cylinder 212 of the actuator and a knuckle 213, by which the rod 208 is connected to the steering arm 209. With the lock being the length shown in FIG. 10, the steering ram 207 cannot be contracted for steering of the vehicle to the right.

Turning to FIGS. 11 and 12, the ram lock comprises a steel U-section channel 214 with end plates 215,216 welded across its ends. The plates are cutaway to match the internal U-shape of the channel and allow the channel to be dropped onto the ram's rod 208, between the cylinder 212 and the knuckle 213. At mid-length of the channel, close to its open edge, it has a bore through both of its flanges 217,218 for a headed pin 219. When the channel is fitted to the rod 208, the pin can be passed into the bores, which prevents the channel from being lifted from the rod. A stem of the pin 219 has a cross-bore for the pin 220 of a "box" type padlock 221. The padlock fits snugly between the flanges of the channel, so that the pin 219 is captivated when the padlock is locked onto it.

Once the padlock is fitted the channel prevents the rod 208 and knuckle 213 being drawn in towards the cylinder, at least beyond the length of the channel.

In an alternative, the channel and its end plates may be of length to just fit between the cylinder and the knuckle when the ram is fully extended, whereby the steering is locked on full lock.

Whilst the lock has been described for locking the steering of the vehicle, it could be used for locking other telescopic actuators, such as the jib and bucket rams of an excavator.

First Variant of the Second Embodiment

Turning to FIGS. 13 and 14, a varied ram lock comprises a U-section channel 254 pressed from steel plate, with end flanges 255,256 bent out at its ends. Towards its mid-length, the channel is deeper and, close to its open edge, it has a bore 257',258' through both of its flanges 257,258 for a headed pin 259. One 258 of the flanges has a turned out lip 270. The pin 259 has a head 271 in the form of a disc 272 welded to a stem 273 of the pin 259. The disk 272 has an edge cut-out leaving a flat 274 which co-operates with the lip 270 to ensure that the pin can be fully engaged in one orientation only. When the channel is fitted to an actuator rod, the pin can be passed into the bores, which prevents the channel from being lifted from the rod. The stem 273 of the pin 259 has a cross-bore 275 for the pin of a "box" type padlock. Fitting of the padlock is eased by the pin being constrained to be oriented such that the bore 275 is parallel with the length of the channel. The padlock fits snugly between the flanges of the channel, so that the the pin 259 is captivated when the padlock is locked onto it.

Second Variant of the Second Embodiment

The second ram lock variant, shown in FIGS. 15 and 16, is an adjustable length disabling device for fitting to differing length rams. This ram lock comprises two pressed steel channel members 301,302, the one being sized to fit within the other. Each has a respective end flange 303,304. Each channel member has a plurality of respectve bores 305,306 in its flanges 307,308. The bores are arrayed along the length of the members, so that when the end flanges are separated by differing amounts, different ones of the bores are aligned. Thus a pin 309 can be inserted in the bores to fix the end flanges at one of the separations at which the bores align. One of the flanges 308 of the outer member 302 has a lip 310 for engaging with a flat 311 on the head 312 of the pin 309 to align the cross bore 313 in the stem 314 of the pin as in the first variant.

THIRD EMBODIMENT OF THE INVENTION

Referring to FIGS. 17 and 18, the third embodiment disabling device comprises a U member 401 of heavy gauge steel—typically 12 mm—steel having limbs 402,403. The limbs are separated from each other by 65 mm to accommodate a towing eye and a padlock between them. They are 100 m high from the base of the U, and 80 mm long. Each limb has an aperture 404 for a stem 405 of a pin 406. One limb 402 has a small section bar 407 welded to it close to its aperture 404.

The pin has, welded onto the stem, a head 408 in the form of an annulus from which a circumferential portion has been cut away to leave a flat 409. The flat is spaced from the centre of the pin such that it fits closely to the bar when the stem of the pin is inserted in the apertures, the flat 409 and the bar 407 cooperating to prevent rotation of the pin. Thus a cross-bore 410 in the stem is oriented parallel to the base 411 for receiving the pin 412 of a "box" type padlock 413.

With the pin passed through the towing eye 420 of a trailer and the padlock in position, the U member 401 prevents removal of the lock from the eye. Thus the trailer is disabled from being coupled to a tractor and unauthorised removal of the trailer is deterred.

As described, the cross-bore 410 is remote from the head 408 of the pin, but still between the limbs 402,403 when the pin is fitted. This is convenient in allowing the U member to be fitted to the eye with the bar carrying limb 402 uppermost and the apertures 404 aligned with the eye. The pin can be dropped in and the padlock fitted beneath the eye with the weight of the lock being carried by the eye. Accommodation of the padlock between the limbs deters tampering with it.

This embodiment is not intended to be restricted to the details described above. For instance, the pin's cross-bore 410 may be provided at the head end of the pin so that the padlock can be fitted immediately on the opposite side of the limb 402 from the head. Further, to allow the lock to be fitted to a variety of sizes of eyes, the limbs may be provided with a plurality of apertures 404, progressively spaced further from the base 411 of the U.

We claim:

1. A disabling device lockable to a telescopic actuator for disabling it, the telescopic actuator having a cylinder and a rod, the rod being telescopically disposed within the cylinder, the rod having a rod end fitting at an end opposite the cylinder, the device comprising:

a U-shaped channel member sized to fit between the cylinder and the rod end fitting, the channel member having a base of the U and two limbs, each limb having an aperture, the two apertures being opposite each other; and a padlock positioned between the limbs of the channel member, the padlock for locking the channel member to the rod of the actuator, whereby the actuator cannot be stroked with the channel member fitted due to interposition of the channel member between the cylinder and the rod end fitting;

wherein:

the device comprises a removable pin having a stem and a head, the stem being sized to engage in the apertures in the U-shaped channel member limbs and to extend through the limbs while engaged in the apertures, the stem having a transverse bore for receiving the padlock between the U-shaped channel member limbs, and the head being too large to pass through the apertures;

the head of the pin and the limb against which it lies when the stem is engaged in the apertures are dimensioned to prevent rotation of the engaged pin so as to align the transverse bore along the length of the U-shaped channel member and thereby facilitate installation of the padlock in the transverse bore and so as to help prevent tampering with the device by preventing rotational movement of the padlock relative to the U-shaped channel member to prevent unauthorized removal of the padlock;

the pin is dimensioned to be locked in position while its stem extends through the limbs of the channel member, wherein the pin is locked in position by the padlock which is positioned between the limbs of the channel member, and an end of the stem opposite from the head cannot be removed from the aperture it is engaged in and the channel member cannot be removed from the rod of the actuator.

2. A disabling device according to claim 1, wherein the channel member has end flanges for abutting the cylinder and the rod end fitting of the actuator without damaging them.

3. A disabling device according to claim 1, wherein the channel member is a double overlapping channel, comprised of two channel elements, each having a plurality of apertures in each limb, the plurality of apertures being arrayed along the length of the channel elements, whereby the separation of the ends of the channel member can be adjusted to suit different lengths of actuator.

4. A disabling device according to claim 1, wherein the head of the pin and the limb are dimensioned in the form of a flat on the head and a bar or flange fixed on the limb, the flat being spaced from the center of the stem of the pin such that it fits closely to the bar or flange when the pin is inserted in the apertures.

* * * * *

UNITED STATES PATENT AND TRADEMARK OFFICE
CERTIFICATE OF CORRECTION

PATENT NO. : 5,794,462
DATED : August 18, 1998
INVENTOR(S) : Steele et al.

It is certified that error appears in the above-identified patent and that said Letters Patent is hereby corrected as shown below:

On the title page,;

INID [56] References Cited 5,372,018 "70/56X" should read

--70/18--.

INID [56] References Cited, Insert:
U.S. PATENT DOCUMENTS
| | | | |
|---|---|---|---|
| 4,693,096 | 09/15/87 | Mercer | 70/14 |
| 3,884,055 | 05/20/75 | Vuillemot | 70/58 |
| 4,571,964 | 02/25/86 | Bratzler | 70/58 |
| 4,732,019 | 03/22/88 | Tolar | 70/203 |
| 4,774,823 | 10/04/98 | Callison | 70/14 |

FOREIGN PATENT DOCUMENTS
| | | |
|---|---|---|
| 2,162,480 | 02/05/86 | U.K. |
| 1,350,086 | 04/18/74 | U.K. |
| 9,316,892 | 09/02/93 | International |

Signed and Sealed this

Twelfth Day of January, 1999

Attest:

Attesting Officer

Acting Commissioner of Patents and Trademarks

UNITED STATES PATENT AND TRADEMARK OFFICE
CERTIFICATE OF CORRECTION

PATENT NO. : 5,794,462
DATED : August 18, 1998
INVENTOR(S) : Steele et al.

It is certified that error appears in the above-identified patent and that said Letters Patent is hereby corrected as shown below:

On the title page,;

INID [56] References Cited 5,372,018 "70/56X" should read

--70/18--.

INID [56] References Cited, Insert:
U.S. PATENT DOCUMENTS
4,693,096    09/15/87    Mercer      70/14
3,884,055    05/20/75    Vuillemot   70/58
4,571,964    02/25/86    Bratzler    70/58
4,732,019    03/22/88    Tolar       70/203
4,774,823    10/04/88    Callison    70/14
FOREIGN PATENT DOCUMENTS
2,162,480    02/05/86    U.K.
1,350,086    04/18/74    U.K.
9,316,892    09/02/93    International This certificate supersedes Certificate of Correction issued January 12, 1999.

Signed and Sealed this

Third Day of August, 1999

Attest:

Q. TODD DICKINSON

*Attesting Officer*    *Acting Commissioner of Patents and Trademarks*